United States Patent [19]
Fortier

[11] Patent Number: 5,942,128
[45] Date of Patent: Aug. 24, 1999

[54] METHOD FOR PROCESSING METAL WORKING FLUID

[75] Inventor: David R. Fortier, Rockville, Conn.

[73] Assignee: United Technologies Corporation, Hartford, Conn.

[21] Appl. No.: 08/998,518

[22] Filed: Dec. 24, 1997

[51] Int. Cl.⁶ .................................................. B01D 17/02
[52] U.S. Cl. ........................ 210/776; 210/787; 210/790; 210/800; 210/805; 210/806; 210/171
[58] Field of Search .................................. 210/767, 776, 210/787, 789, 790, 800, 805, 806, 168, 171, 172

[56] References Cited

U.S. PATENT DOCUMENTS

| | | | |
|---|---|---|---|
| 678,551 | 7/1901 | Dimmick | 210/540 |
| 911,314 | 2/1909 | Maranville | 210/540 |
| 1,107,391 | 8/1914 | Welch | 210/242.3 |
| 1,147,881 | 7/1915 | Morris | 210/540 |
| 3,616,923 | 11/1971 | Haley | 210/242.3 |
| 3,753,496 | 8/1973 | Boyd | 210/242.3 |
| 4,139,464 | 2/1979 | Coward | 210/805 |
| 4,366,069 | 12/1982 | Dudrey et al. | 210/805 |
| 4,655,940 | 4/1987 | Harms | 210/805 |
| 4,772,402 | 9/1988 | Love | 210/805 |
| 4,773,992 | 9/1988 | Dietrich et al. | 210/167 |
| 4,872,997 | 10/1989 | Becker | 210/202 |
| 4,892,666 | 1/1990 | Parlson | 210/540 |
| 5,089,118 | 2/1992 | Mahoney | 210/523 |
| 5,141,632 | 8/1992 | Catcher | 210/923 |
| 5,158,677 | 10/1992 | Hewitt et al. | 210/776 |
| 5,300,220 | 4/1994 | McEwen | 210/171 |
| 5,451,330 | 9/1995 | Garrett | 210/776 |
| 5,458,770 | 10/1995 | Fentz | 210/171 |
| 5,601,705 | 2/1997 | Glasgow | 210/122 |

*Primary Examiner*—Christopher Upton
*Attorney, Agent, or Firm*—Gene D. Fleischhauer

[57] ABSTRACT

A method for processing metalworking fluid disposed in a sump 12 is disclosed and includes the step of collecting metalworking fluid having a greater concentration of tramp oil than the concentration in the sump and flowing a portion of this oil, without passing the oil through a separator, to increase circulation in the sump. Various steps of the method are developed which increase the level of tramp oil removed from the sump and provide for the introduction of oxygen into the working medium of fluid. In one particular embodiment of the method, the step of flowing the return fluid under pressure to the sump, includes forming jets of fluid which extend vertically into the air to aerate the metalworking fluid and block the proliferation of anaerobic bacteria.

13 Claims, 4 Drawing Sheets

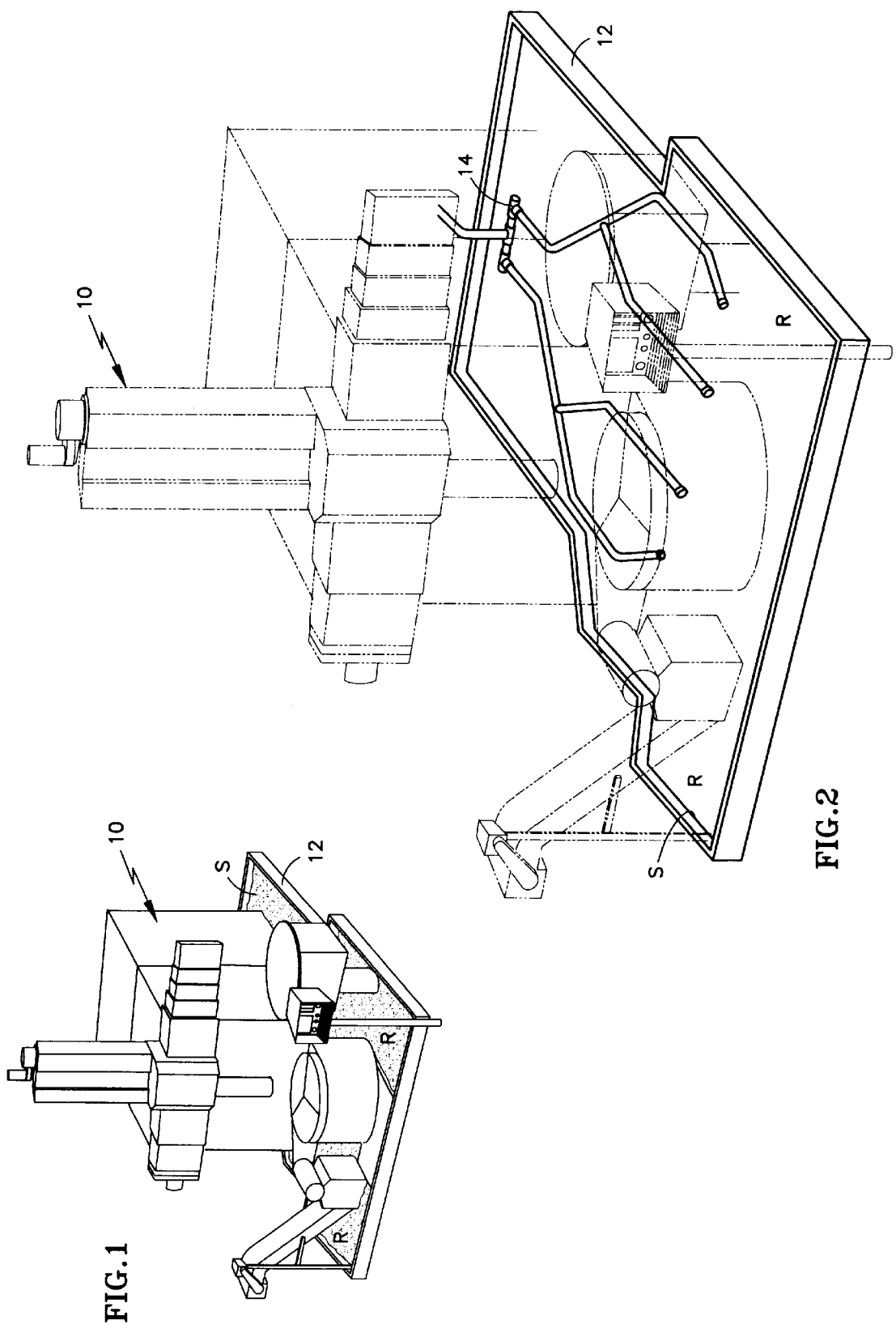

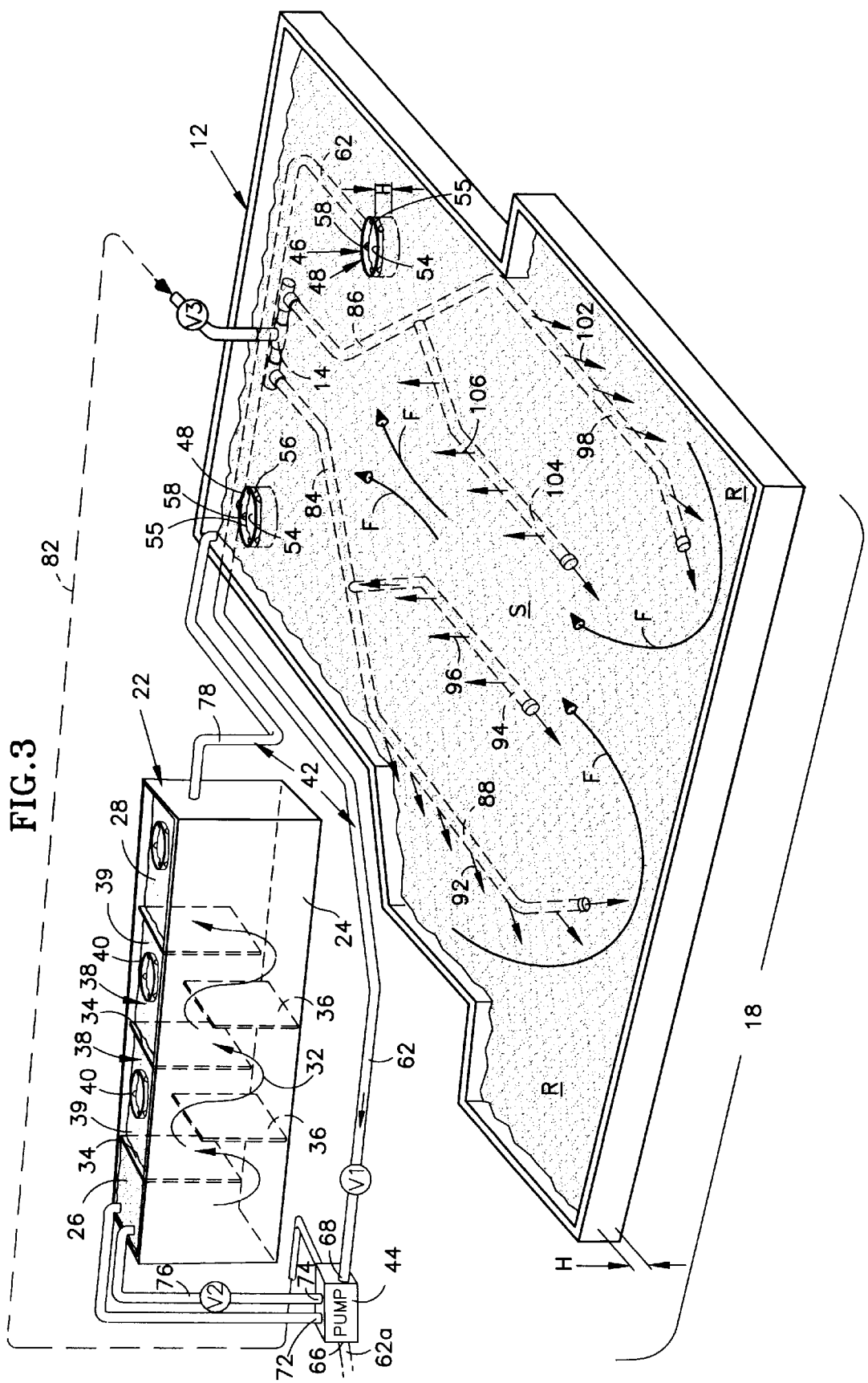

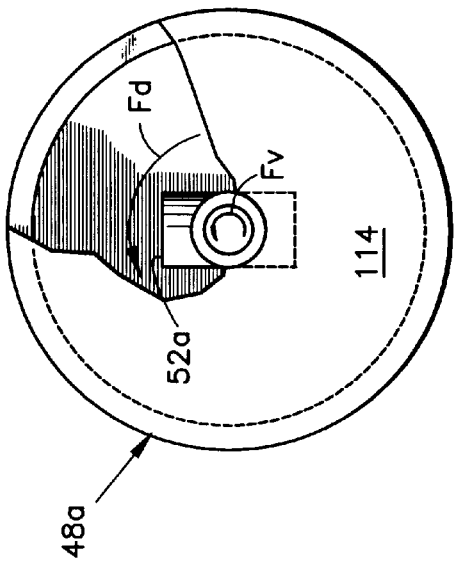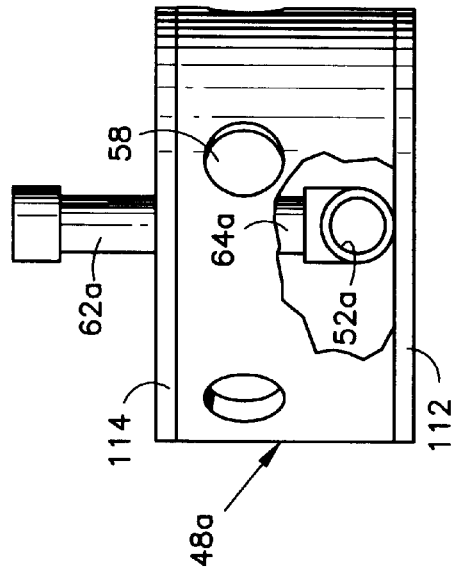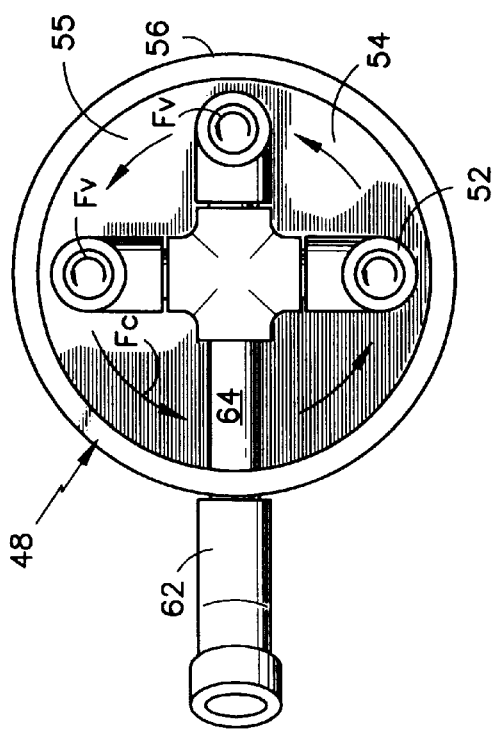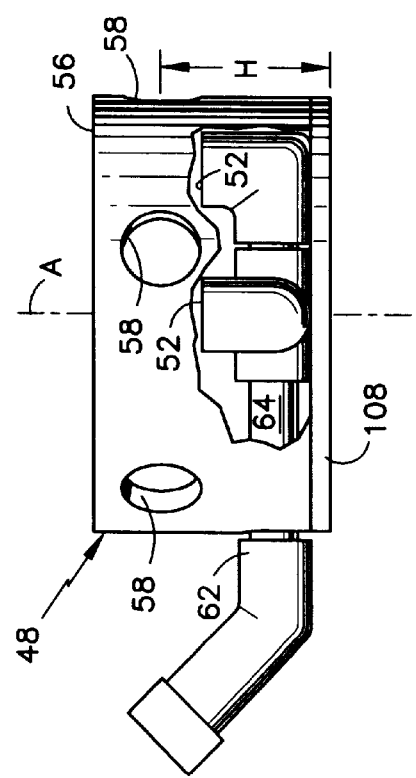

METHOD FOR PROCESSING METAL WORKING FLUID

CROSS-REFERENCE TO RELATED APPLICATION

This application relates to copending U.S. application Ser. No. 08/997,938 entitled "Apparatus for Receiving Metalworking Fluid", by David R. Fortier, and copending U.S. application Ser. No. 8/997,939 entitled "Apparatus for Processing Metalworking Fluid", by David R. Fortier.

TECHNICAL FIELD

This invention relates to an apparatus for processing metalworking fluids used with tools for removing metal, and, more particularly for a method of processing the fluid to remove contaminants and retard the growth of bacteria.

BACKGROUND

Metalworking processes use machines having cutting tools, grinding devices or other tools to remove metal from a workpiece. These tools generate heat by sliding friction at the interface between the tool and the workpiece. Metalworking fluids are sprayed on the interface to wash away chips, improve surface finish, increase tool life, reduce the power required and to cool the tool and the workpiece. These fluids are commonly called coolant because cooling is one of the major functions of the fluids.

There are a wide variety of metalworking fluids including compounded mineral oils, fixed and sulfurized oils, and water and oil emulsions. Emulsions of water and water soluble oil are one class of metalworking fluids widely used for metalworking processes. The emulsion resembles milk in appearance, is not expensive and has low viscosity permitting the emulsion to separate readily from the chips. In addition, the emulsion has good coolant properties for removing heat from the tool and work piece to keep their temperatures within acceptable limits. Unacceptable levels of temperature in the cutting tool or the work piece can result in deterioration of both the work piece and the cutting tool ultimately resulting in failure of the cutting tools or irreparable damage to the work piece.

In one application, an emulsion of 95% water and 5% lubricating oil is sprayed on the tool and on the workpiece. As the metalworking fluid is sprayed on the workpiece and cutting tool, the metalworking fluid performs its functions, such as cooling, and drains to a fluid sump. The sump is disposed beneath the machine and collects the metalworking fluid, along with chips and other debris carried by the fluid. The fluid also carries tramp oil which has leaked from gear boxes and transmissions on the machine, or which has lubricated sliding surfaces on the ways, and which was protecting the workpiece from corrosion prior to a machining operation. The tramp oil floats on the surface of the fluid in the sump.

The metalworking fluid contaminated with tramp oil is creates an ideal breeding place for anaerobic bacteria in the sump. The tramp oil forms a layer on the top of the fluid, sealing the fluid from contact with oxygen in the air. The bacteria breed, consuming the tramp oil for nourishment and ultimately degrading the quality of the fluid to such an extent that it no longer performs it useful function and turns rancid. The fluid is then discarded.

One approach to removing the tramp oil is to dispose a conduit having a floating inlet within the upper layer of fluid in the sump. The floating inlet is in flow communication with a separator for separating tramp oil from the fluid. The separator typically has a tortuous flowpath along which the fluid is flowed. The flow path leaves the tramp oil in a series of pools at the top of the separator, separating the tramp oil from the fluid. The tramp oil is removed and the now, less contaminated fluid returns to the sump. Occasionally, the floating inlet for the separator conduit sinks below the surface of the fluid in the sump and primarily returns pure fluid to the separator leaving the tramp oil on the top layer of the fluid with the unfortunate results described above.

Accordingly, personnel working under the direction of Applicant's assignee have sought to develop a fluid processing system which would separate tramp oil from the fluid and retard the growth of anaerobic bacteria within the fluid.

SUMMARY OF INVENTION

This invention is in part predicated on the recognition that flow to the separator is such a low level that circulation of the metalworking fluid within the metalworking fluid sump results in dead zones of little or no circulation in the sump in which bacteria and other harmful micro organisms flourish once a thin film of tramp oil forms on the fluid in the dead zone.

According to the present invention, a method for processing metalworking fluid having tramp oil disposed in the sump includes circulating an additional amount of the metalworking fluid from the sump and returning it to the sump at a flow rate which is greater than the flow rate which is passed through the separator such that positive circulation of metalworking fluid takes place in predetermined dead zones of the metalworking fluid sump.

In accordance with the present invention, the step of circulating an additional amount of metalworking fluid from the sump includes aerating a portion of the metalworking fluid which is bypassed from the separator.

In accordance with one detailed embodiment of the present invention, the method of aerating the metalworking fluid includes forming a vortex as the fluid is sucked from a collection chamber to entrain air into the metalworking fluid and retard the growth of anaerobic bacteria. In accordance with another embodiment of the present invention, a portion of the returned metalworking fluid is aerated by spraying jets of metalworking fluid which extend vertically, breaking the plane of the surface of the metalworking fluid and impacting the underside of the machine and returning to the sump enriched with oxygen.

A primary feature of the present method is the step of recirculating a portion of metalworking fluid to the sump at a rate which is equal to or greater than the flow rate of metalworking fluid going to the separator to positively distribute metalworking fluid within selected dead zones in the sump. This may include flowing a portion of the fluid from the separator under pressure to the sump. Another feature of the present invention is the step of aerating the metalworking fluid as the fluid is sucked from the sump. A feature of one embodiment of the present invention is the step of aerating the metalworking fluid as metalworking fluid is returned to the metalworking fluid sump by spraying the metalworking fluid against a portion of the machinery above the metalworking fluid sump.

A primary advantage of the present invention is the decreased cost of operating a metalworking fluid system for a machine tool which results from retarding the formation of bacteria within the metalworking fluid and separating the tramp oil from the metalworking fluid. Another advantage of the present invention is the health and safety of the work place which results from avoiding the formation of bacteria in the metalworking fluid and odors associated with such metalworking fluid. Still another advantage of the present invention is the level of lubricating properties and cooling properties of the metalworking fluid during the life cycle of the metalworking fluid which results from reducing the level of contaminants in the metalworking fluid.

The foregoing features and advantages of the present invention will become more apparent in light of the following detailed description of the best mode for carrying out the invention and accompanying drawings.

BRIEF DESCRIPTION OF THE DRAWINGS

FIG. 1 is a perspective view of a machine for metalworking having a sump disposed beneath the machine for receiving metalworking fluid.

FIG. 2 is a perspective view of the machine shown in FIG. 1 with the machine shown in phantom, and shows the sump and fluid distribution system for the sump which is disposed in the sump.

FIG. 3 is a schematic representation of an apparatus for processing metalworking fluid which includes the sump and the embodiment of the fluid distribution system shown in FIG. 2.

FIG. 4 is a side elevation view of a collection chamber partially broken away to show a conduit and an orifice disposed in the collection chamber.

FIG. 4A is a top view of the collection chamber with lines of flow of the metalworking fluid shown by arrows.

FIG. 5 is a side elevation view of an alternate embodiment of the collection chamber shown in FIG. 4.

FIG. 5A is a top view of the embodiment of the collection chamber shown in FIG. 5.

BEST MODE FOR CARRYING OUT THE INVENTION

Figure 6:
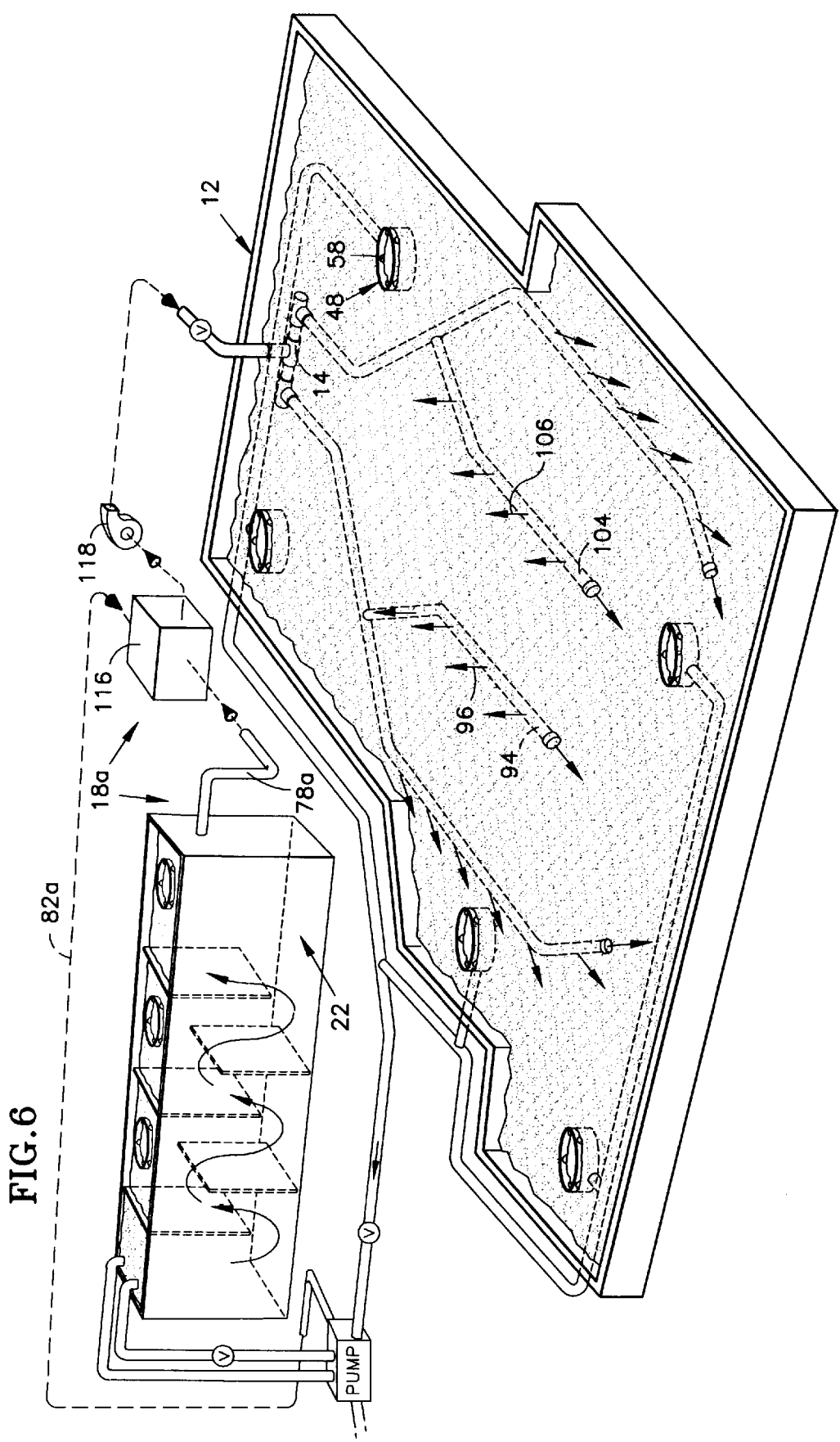
FIG. 6 is an alternate embodiment of the apparatus for processing metalworking fluid shown in FIG. 3.

FIG. 1 is a perspective schematic, view of a machine 10 for metalworking. The machine has a sump 12 disposed beneath the machine for receiving metalworking fluid. The machine has a spray system (not shown) for spraying metalworking fluid on a workpiece (not shown). A substantial portion of the metalworking fluid for the spray system is disposed in the sump 12 beneath the machine where it is recirculated by the spray system.

FIG. 2 is a perspective view of the machine 10 shown in FIG. 1 with the machine shown in phantom. FIG. 2 shows the sump 12. A fluid distribution system 14 for the sump is disposed in the sump beneath the machine. The fluid distribution system is disposed below the surface level S of the fluid. The sump has regions of fluid circulation under operative conditions which include at least one region R of potentially lower circulation. The regions of potentially lower circulation result from the contour of the sump and portions of the machine which extend into the sump. These create zones of little or no circulation unless the fluid is positively circulated by the fluid distribution system.

FIG. 3 is a schematic representation of an apparatus 18 for processing metalworking fluid which includes the sump 12 and the embodiment of the fluid distribution system 14 shown in FIG. 2. As shown in FIG. 3, the apparatus for processing metalworking fluid includes a separator 22 for processing metalworking fluid that has tramp oil. The separator is simply represented as a tank 24 having an inlet chamber 26 and an outlet chamber 28. A continuous flow path 32 for the metalworking fluid extends through the tank. Downwardly projecting baffles 34 and upwardly projecting baffles 36 define the flow path. The baffles divide the tank into a plurality of separation regions 38 each having a pool 39 at the top of the separation region. The pool has a collection chamber 40 disposed in the separator. One acceptable separator is the Tramp Champ model separator, available from Porter Systems, Inc., P.O. Box 535, Bridgeport, N.Y. 13030.

The apparatus 18 for processing metalworking fluid includes a circulation system 42. The circulation system is in flow communication with the separator 22 and the fluid distribution system 14 for the sump 12. The circulation system removes metalworking fluid from the sump, flowing an amount of fluid per unit time from the sump. A first amount per unit time is sent to the separator. A second amount per unit time by-passes the separator 22 and is sent directly to the fluid distribution system 14 in the sump.

The circulation system 42 uses one or more pumps 44 for flowing the metalworking fluid through the system. In the embodiment shown, a single pump is used with appropriate valuing V1, V2, V3. Pumps in fluid communication with two or more of the conduits or disposed in the fluid distribution system in the sump 12 are equivalents of the one or more pumps shown in FIGS. 3 and 5.

The circulation system 42 includes an apparatus 46 for receiving (collecting) metalworking fluid. The apparatus includes a collection chamber 48 and at least one collection orifice 52 or more as shown in FIGS. 4–5A. The orifice is at the collection chamber and may be separate from the collection chamber or formed integrally with the collection chamber, such as by simply boring a hole in the chamber.

The collection chamber 48 is disposed in the pool of metalworking fluid in the sump 12. The collection chamber has an interior 54 having a collection region 55. The interior adapts the chamber to receive metalworking fluid having a higher concentration of tramp oil than the adjacent fluid in the sump 12 (that is, the concentration of tramp oil per unit volume of metalworking fluid in the collection chamber is greater than the concentration of tramp oil per unit volume of fluid in the sump less the amount of working fluid in the collection chamber).

The interior 54 of the chamber is bounded by a wall 56. The wall has at least one opening 58 at a level which is approximately equal to the level of fluid (height H of fluid) such that an upper portion of fluid in the sump flows into the collection chamber 48 through the opening 58.

One or more first collection conduits 62 are in flow communication with one or more collection chambers 48. All conduits, such as conduit 62, have an associated flow-path designated by the addition of the letter f (62f). Each collection conduit has at least one leg 64 in flow communication through the collection orifice 52 and with the interior 54 of the collection chamber. The collection conduit has an adjustable valve V1. The pump 44a has a first inlet 66 in flow communication with a collection conduit 62a for another sump (not shown). A second inlet 68 is in flow communication through the first collection conduit with the sump 12. The pump has one or more outlets such as the first outlet (not shown) for pressurized flow to the sump 12, a second outlet 72 for pressurized flow from the other sump to the separator 22 and a third outlet 74 for pressurized flow to the separator. A second separator conduit 76 places the outlet 74 of the pump in flow communication with the inlet 26 to the separator 22. A third return conduit 78 extends from the separator for returning metalworking fluid to the sump 12 with a smaller concentration of tramp oil than the concentration of tramp oil in the fluid of the sump . A fourth return conduit 82 is in flow communication with the collection conduit through the outlet of the pump. The fourth return conduit supplies pressurized flow to the fluid distribution system 14 through the valve.

The fluid distribution system 14 in the sump 12 has a first conduit 84 and a second conduit 86 in flow communication with the fourth return conduit 82. The fluid distribution system supplies pressurized fluid to the sump 12. The first conduit has a first leg 88 having a flow path 88f which extends into a region of naturally lower circulation of the sump. The first leg of the conduit has a plurality of exit orifices, as represented by the arrows 92 (angled at an angle of twenty (20) degrees to the direction of the flowpath in a horizontal plane and at an angle of twenty to twenty-five (20–25) degrees upwardly in a vertical plane). The exit orifices direct fluid away from the conduit and upwardly toward the surface S of the fluid in the fluid sump 12. A second leg 94 has a flowpath 94f and has a plurality of exit orifices 96 which extend in a vertical direction for directing jets of fluid through the fluid, into the air above and against the underside of the machine which is shown in FIG. 1 and FIG. 2.

The second conduit 86 has a first leg 98 having a flow path 98f which extends into a region R of naturally lower circulation of the sump. The conduit has a plurality of exit orifices, as represented by the arrows 102 (angled at an angle of twenty (20) degrees to the direction of the flowpath in a horizontal plane and at an angle of twenty to twenty-five (20–25) degrees upwardly in a vertical plane). The exit orifices 102 direct fluid away from the conduit 86 and upwardly toward the surface S of the fluid in the fluid sump 12. A second leg 104 has a flowpath 104f and has a plurality of exit orifices 106 which extend in a vertical direction for directing jets of fluid through the fluid, into the air above and against the underside of the machine 10 which is shown in FIG. 1 and FIG. 2.

Lines of flow F are shown in the sump 12. These lines of flow represent one flow pattern for the metalworking fluid in the sump. The lines of flow extend through regions R of potentially low or no flow urging metalworking fluid to circulate in the sump. As a result, metalworking fluid containing tramp oil is in flow communication with the remaining fluid in the sump. This insures that the tramp oil on the surface has had an opportunity to move into a region adjacent the collection chambers 48. As will be realized, the same orientation of fluid conduits 84,86 for the same sump 12 may result in different flow patterns for different machines. This results in part from contours of the different machines which distribute sprayed metalworking fluid to regions of the sump that differ from regions shown in FIG. 1 and from support structure of the different machines which might extend at other locations into the sump.

FIG. 4 is a side elevation view of a collection chamber 48 partially broken away to show the collection conduit 62 and a collection orifice 52 disposed on the interior 54 of the chamber. In the embodiment shown, the wall 56 of the collection chamber is a curved surface and, in particular, is cylindrical. In other embodiments, the wall might be one of four walls forming a rectangle, a square or other shapes.

The cylindrical wall 56 extends circumferentially about the interior 54 of the chamber 48. The cylindrical wall is disposed about an axis of symmetry A. A bottom 108 extends from the wall and seals the bottom of the collection chamber. In alternate embodiments, the bottom of the collection chamber might be open with the bottom of the collection chamber sealed by the bottom of the sump.

A plurality of cylindrical openings 58 extend through the wall 56. The openings 58 are circumferentially spaced one from the other. The openings 58 have a diameter which is approximately equal to one-third the height of the collection chamber 48. Each cylindrical opening has a center located at a position which is approximately level with the level of coolant H in the sump 12 under normal operative conditions. In the embodiment shown, the collection chamber is approximately four and one-half inches high, has a cylindrical opening 58 having a diameter of approximately one and one-half inches and the center of the opening 58 is approximately three inches from the bottom 108 of the chamber.

The collection chamber 48 includes a plurality of collection orifices 52 that are in flow communication with the leg of the first collection conduit 62. The collection orifices face in a predetermined direction for sucking fluid from the collection chamber. The orifices are disposed at a level which is below the level of the opening in the wall. In the embodiment shown, the collection orifice to spaced less than one-half of an inch (approximately three tenths of an inch) from the bottom surface of the opening. As shown the orifices face in a vertical direction away from the bottom of the collection chamber.

FIG. 4A is a top view of the collection chamber 48. Lines of flow of the metalworking fluid are shown by arrows in the collection chamber. As shown in FIG. 4A, the collection chamber has three orifices 52, two of which are spaced ninety degrees from the third. Lines of flow in the chamber are represented by the arrows Fv showing formation of the vortex at each orifice. Lines Fc show general circulation within the collection chamber that results in part from the flow Fv at the orifices.

FIG. 5 is a side elevation view of an alternate embodiment 48a of the collection chamber 48 shown in FIG. 4. The collection chamber 48a has a bottom 112 and a top 114. The first conduit 62a has a leg 64a extending down through the top of the collection chamber. In this embodiment, the collection chamber has two orifices 52a spaced a distance below the opening 58 which is more than one inch. The orifices face in the horizontal direction, that is, perpendicular to the wall 56. Experience has shown that a significantly greater flow rate is required to establish a vortex than for the FIG. 4 embodiment.

FIG. 5A is a top view of the embodiment of the collection chamber 48a shown in FIG. 5 showing the vortex Fv and the lines of flow Fd.

FIG. 6 is an alternate embodiment 18a of the apparatus 18 for processing metalworking fluid shown in FIG. 3. In FIG. 6, the circulation system 42 includes an intermediate supply tank 116. A pump 118 supplies pressurized fluid to the fluid distribution system 14. The third conduit 78a from the separator 22 having unpressurized clean fluid and the fourth conduit 82a having pressurized collected fluid are fed into the intermediate tank. The metalworking fluid in the tank has a tramp oil concentration which is greater than the tramp oil concentration in the collected fluid from the separator 22, but less than the tramp oil concentration in collected fluid from the fourth conduit.

During operation of the apparatus 18 shown in FIG. 3, the apparatus processes the metalworking fluid. The collection region 55 is formed on the interior 54 of the collection chamber 48 which has metalworking fluid having a higher concentration of tramp oil than the concentration of tramp oil in the sump 12. The orifices 52 of the collection chamber are disposed close to the surface of the fluid. Less metalworking fluid enters with the tramp oil. As a result, the tramp oil concentration of the fluid sucked in by the orifice 52,52a is even greater than the concentration of tramp oil generally in the collection region, making the tramp oil concentration flowed to the separator 22 even greater than the concentration of tramp oil in the sump. Having provided the sump with a fluid distribution system 14 to circulate flow in the sump, the amount of collected fluid is divided in the circulation system 42 between the separator and the fluid distribution system. The fluid returned from the circulation system to the sump 12 through the fluid distribution system provides pressurized fluid which is directed at regions of lower circulation.

In the embodiment shown, the fluid returned to the sump 12 may also be aerated by spraying the fluid into the air and against the machine 10 to further expose the fluid to air. The air contains oxygen and provides an unfriendly environment to anaerobic bacteria. In addition, the spray breaks the surface S of the fluid, carrying oxygen back down through the tramp oil and into the metalworking fluid in the sump.

In the embodiment shown in FIG. 6, the metalworking fluid is flowed to an intermediate tank 116 which contains a reservoir of working medium fluid. This reservoir of fluid is used to add fluid to the sump 12 by means of the pump 118. The flow rate of the pump is responsive to the level of coolant in the sump by conventional electrical, flow and/or pressure sensing means (not shown). This allows for the intermediate tank to supply fluid to the sump 12 should evaporation or heavy cutting require the usage of increased levels of metalworking fluid which would lower the level of metalworking fluid in the sump 12 so that the level falls below the openings 58 to the collection chamber 48. This insures that the pump is constantly supplied with fluid and fluid continuously flows through the pump.

In either of the FIG. 3 or FIG. 6 embodiments, a particular advantage of the present invention is the ability to flow the required amount of pressurized circulation fluid to the sump 12 and to tailor the flow to insure that regions of low or no flow are avoided and to retard the growth of anaerobic bacteria which may spoil the metalworking fluid or degrade its performance. As shown by the lines of circulation in FIG. 3, oil moves towards the collection chamber and the conduits, typically made of polyvinyl chloride (PVC) tubing, may be easily altered or flexibly oriented for installation or as required to provide for necessary circulation.

The separator 22 has limited flow capacity and benefits from the twice increased concentration of tramp oil in the fluid flowed to the separator. This increase in concentration of tramp oil results from operation of the collection chamber 48.

Another benefit of the collection chamber is the formation of vortices in the collection chamber 48. These vortices combine to reinforce each other in the collection chamber shown in FIG. 4 and cause circumferential circulation of the metalworking fluid in the chamber. The lighter tramp oil is forced inwardly by the more dense metalworking fluid moving outwardly in response to this rotational movement of the fluid, This forces the lighter tramp oil to concentrate about the axis of the collection chamber where it is sucked into the orifice for processing at the separator 22. Another benefit is the ability to adjust the size of the vortex by regulating flow. This controls the amount of air the vortex entrains into the metalworking fluid. The valves and thus the flow are adjusted to insure that the vortex does not ingest too much air. Too much air would cause cavitation in the pump. Nevertheless, the vortex is big enough to provide the circulation described above for increasing the tramp oil density in the collected flow.

Although the invention has been shown and described with respect to detailed embodiments thereof, it should be understood by those skilled in the art that various changes in form and detail thereof may be made without departing from the spirit and the scope of the claimed invention.

What is claimed is:

1. A method for processing metalworking fluid disposed in a sump which has a pool of the fluid having a surface, the sump having regions of fluid circulation which includes at least one region of potentially lower circulation under operative conditions, and having tramp oil which accumulates at the surface of the pool at a first concentration per unit of fluid and which is removed by flowing a portion of the fluid to a separator, comprising:

collecting fluid from the sump from a collection region, the collected fluid having a second, greater concentration of tramp oil than the first concentration in the sump;

providing a fluid distribution system to the sump which has a flow path in fluid communication with the region of lower circulation;

flowing an amount of collected fluid from the sump which includes flowing a first amount of the collected fluid per unit of time to a separator for decreasing the concentration of tramp oil in the collected fluid to a third concentration;

flowing the first amount of collected fluid per unit of time having the third concentration of tramp oil to the sump;

flowing a second amount of collected fluid per unit of time to the fluid distribution system which has a concentration of tramp oil that is greater than the decreased third concentration of the first amount;

wherein the second amount of collected fluid flowed to the fluid distribution system for the sump is at least equal to the first amount of collected fluid flowed to the separator per unit of time, wherein the second amount is directed with at least one jet toward a location which urges metalworking fluid in the sump to circulate toward the collection region and wherein the increased concentration of tramp oil flowed to the separator as compared to the concentration in the sump increases the amount of tramp oil removed by the separator per unit of flow of sump fluid.

2. The method for processing metalworking fluid disposed in a sump having a pool of such fluid of claim 1 wherein the step of collecting fluid from a collection region includes disposing a collection chamber in the sump which bounds the collection region, the chamber being in flow communication with the uppermost one inch depth of fluid adjacent the chamber; and flowing the fluid into the collection chamber from the upper most one inch depth of fluid adjacent the collection chamber.

3. The method for processing metalworking fluid disposed in a sump having a pool of such fluid of claim 2 wherein the second amount of collected fluid flowed to the sump through the fluid distribution system is greater than the first amount and includes at least a portion of the first amount of collected fluid.

4. The method for processing metalworking fluid disposed in a sump having a pool of such fluid of claim 2 wherein the step of flowing an amount of collected fluid from the sump includes sucking an amount of collected fluid per unit of time from the collection chamber at a flow rate which causes the level of the fluid in the collection chamber to be lower than the level of fluid in the sump.

5. The method for processing metalworking fluid disposed in a sump having a pool of such fluid of claim 2 wherein the step of flowing an amount of collected fluid from the sump includes forming a vortex in the collected fluid within the collection chamber.

6. The method for processing metalworking fluid disposed in a sump having a pool of such fluid of claim 1 wherein the step of flowing an amount of collected fluid from the sump includes forming a vortex in the collected fluid.

7. The method for processing metalworking fluid disposed in a sump having a pool of such fluid of claim 1 wherein the fluid distribution system has a first flowpath and a second flowpath; and wherein the step of flowing a second amount of collected fluid per unit of time to the fluid distribution system includes flowing a first part of the collected fluid along the first flowpath and forming a plurality of jets of fluid which are angled toward an area of potentially lower fluid circulation in the sump.

8. The method for processing metalworking fluid disposed in a sump having a pool of such fluid of claim 7 which includes the step of flowing a first part of collected fluid along the first flowpath and forming a plurality of jets of fluid which includes angling the jets at a horizontal angle to the flowpath and angling the jets upwardly to direct the jets toward tramp oil at the surface and toward an area of decreased fluid circulation in the sump.

9. The method for processing metalworking fluid disposed in a sump having a pool of such fluid of claim 7 which includes flowing a first part along the first flowpath further includes flowing a second part of collected fluid along the second flowpath and forming a plurality of jets of the collected fluid which are oriented in a vertical direction and break through the surface of the fluid entering the ambient air above the sump.

10. The method for processing metalworking fluid disposed in a sump having a pool of such fluid of claim 9 wherein the step of forming a plurality of jets of the collected fluid which are oriented in a vertical direction and break through the surface of the fluid entering the ambient air above the sump, includes the steps of impacting the jet on the underside of a metalworking machine while aerating the collected fluid.

11. A method for processing metalworking fluid disposed in a sump having a pool of such fluid, the sump having at least a portion extending beneath a machine, having regions of fluid circulation at least one of which is potentially a region of lower circulation under operative conditions, the fluid being contaminated with tramp oil which accumulates at the surface and which is removed by flowing a portion of the fluid to a separator, comprising:

disposing a collection chamber in the sump in flow communication with the uppermost one inch depth of fluid which is adjacent the chamber;

collecting fluid in the collection chamber by flowing an amount of fluid per unit of time from the upper most one inch depth of fluid adjacent the collection chamber into the collection chamber, the collected fluid in the collection chamber having a greater concentration of tramp oil per unit of volume of fluid in the chamber than tramp oil in the sump;

sucking an amount of collected fluid per unit of time from the collection chamber at a flow rate which causes the level of the fluid in the collection chamber to be lower than the level of fluid in the sump, the step of sucking the collected fluid including forming a vortex in the collected fluid, and aerating the collected fluid;

flowing a first amount of the collected fluid per unit of time to a separator to decrease the concentration of tramp oil in the collected fluid;

flowing the first amount of collected fluid per unit of time having a decreased concentration of tramp oil to the sump;

flowing a second amount of collected fluid per unit of time which has a second concentration of tramp oil that is greater than the decreased concentration of the first amount, to a fluid distribution system having a first and a second flowpath disposed within the sump which includes flowing a first part along the first flowpath and forming a plurality of jets of fluid which are angled at a horizontal angle to the flowpath and angled upwardly to direct the jets toward tramp oil at the surface and toward an area of decreased fluid circulation in the sump;

flowing a second part along the second flowpath and forming a plurality of jets of the collected fluid which are oriented in a vertical direction and break through the surface of the fluid entering the ambient air above the sump, which includes the steps of impacting the jet on the underside of the machine and aerating the collected fluid;

wherein the second amount of collected fluid flowed to the fluid distribution system in the sump is at least equal to the first amount of collected fluid flowed to the separator per unit of time, wherein oxygen added to the collected fluid in the collection chamber and in the vertical jets from the sump blocks the growth of anaerobic bacteria in the metalworking fluid, wherein the jets of collected fluid in the sump force the circulation of fluid in the sump toward the collection chamber and wherein the increased concentration of tramp oil flowed to the separator as compared to the concentration in the sump increases the amount of tramp oil removed by the separator per unit of flow of sump fluid.

12. The method for processing metalworking fluid disposed in a sump having a pool of such fluid of claim 11 wherein the second amount of collected fluid flowed to the fluid distribution system in the sump is at least twice the first amount of collected fluid flowed to the separator per unit of time.

13. The method for processing metalworking fluid disposed in a sump having a pool of such fluid of claim 11 wherein the amount of collected fluid per unit of time is such that a volume of fluid equal to the volume of fluid in the sump is collected less than one hour.

* * * * *